United States Patent Office — 3,159,552 — Patented Dec. 1, 1964

3,159,552
PROCESS OF PRODUCING 4-DEDIMETHYLAMINO-4-METHYLETHYLAMINO - 5 - HYDROXYTETRA-CYCLINE
Philip Andrew Miller, West Nyack, and Howard Seebree Corey, Jr., New City, N.Y., assignors to American Cyanamid Company, Stamford, Conn., a corporation of Maine
No Drawing. Filed May 24, 1963, Ser. No. 282,853
4 Claims. (Cl. 195—80)

This invention relates to a novel process of producing 4 - dedimethylamino-4-methylethylamino-5-hydroxytetracycline and, more particularly, is concerned with the production of 4-dedimethylamino-4-methylethylamino-5-hydroxytetracycline by submerged aerobic fermentation of a 5-hydroxytetracycline producing strain of a species of the genus Streptomyces such as S. rimosus, S. platensis or S. hygroscopicus in the presence of l-ethionine. An appropriate chemical name for the product of the novel process of the present invention, according to Chemical Abstracts nomenclature, is 4-methylethylamino-1,4,4a,5,6,11,12,12a-octahydro - 3,5,6,10,12a-pentahydroxy-6-methyl-1,11,12-trioxo-2-naphthacenecarboxamide.

During the past decade, numerous metabolic products of the growth of bacteria and fungi have been isolated and found to posses valuable therapeutic properties. 4-dedimethylamino - 4 - methylethylamine-5-hydroxytetracycline has been reported to possess in vitro activity comparable to oxytetracycline against a wide spectrum of bacteria. In preliminary studies in vivo, it was reported to be half as active as oxytetracycline in protecting mice from *Staphylococcus aureus* and *Diplococcus pneumoniae* infections.

The present invention is based upon the discovery that the addition of l-ethionine to a fermentation medium in amounts ranging from about 0.08 mg./ml. to about 2.0 mg./ml. provides excellent yields of 4-dedimethylamino-4 - methylethylamino - 5-hydroxytetracycline. Although d-ethionine alone does not contribute to the formation of 4 - dedimethylamino-4-methylethylamino-5-hydroxytetracycline, amounts of dl-ethionine ranging from about 0.10 mg./ml. to about 4.0 mg./ml. may be satisfactorily employed with a 5-hydroxytetracycline producing strain of a species of the genus Streptomyces selected from the group consisting of *S. rimosus*, *S. platensis* or *S. hygroscopicus*. Typical 5-hydroxytetracycline producing strains that are operative in the novel process of the present invention are *S. rimosus* (ATCC No. 10970), *S. platensis* (NRRL No. 2364), and *S. hygroscopicus* (NRRL No. B-1503).

The conditions of the fermentation are generally the same as the presently known methods of producing tetracycline, 7-chloroetetracycline or 5-hydroxytetracycline by fermentation. That is, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers' solubles, wheat gluten, cottonseed meal, inorganic salts and other conventional substances. The inorganic salts include calcium carbonate, ammonium sulfate, ammonium chloride and the various trace elements such as manganese, cobalt, zinc, copper, iron and the like.

The other general conditions of the fermentation, such as hydrogen ion concentration, temperature, time, rate of aeration, alternative methods for preparation of the inoculum, sterilization, inoculation and the like are conventional and may be similar to those conditions used for the production of 7-chlorotetracycline shown in United States Patent No. 2,482,055 to Duggar; for the production of tetracycline shown in United States Patent No. 2,734,018 to Minieri et al.; and for the production of 5-hydroxytetracycline shown in United States Patent No. 2,516,080 to Sobin et al.

A suitable inoculum may be obtained by employing a growth from slants or Roux bottles inoculated with a 5-hydroxytetracycline producing strain of the species *S. rimosus*, *S. platensis* or *S. hygroscopicus*. A suitable solid media for this initial growth is beef lactose. This growth is then used to inoculate either shaker flasks or submerged inoculum tanks. The broth containing the microorganism is added to the fermentor under aseptic conditions and the growth is continued for a suitable period of time.

The recovery of the 4-dedimethylamino-4-methylethylamino-5-hydroxytetracycline from the fermentation liquors may be achieved by any of the conventional methods for the recovery of 5-hydroxytetracycline, 7-chlorotetracycline or tetracycline given in the aforementioned U.S. patents.

Various salts of 4-dedimethylamino-4-methylethylamino-5-hydroxytetracycline may be obtained most simply by adding the desired mineral or organic acid to this compound in water until a clear solution is obtained. The solid salts may be prepared by adjusting the pH of such a solution to a point just below that at which the antibiotic would begin to separate. The salts may then be recovered simply by drying the solution. Acid salts of 4 - dedimethylamino-4-methylethylamino-5-hydroxytetraacycline are obtained by evaporation of a solution of the salt in water at a low pH. Acids which may be used are sulfuric, hydrochloric, phosphoric, citric, tartaric, gluconic and the like.

The invention will be described in greater detail in conjunction with the following specific examples.

EXAMPLE 1

*Production of 4-Dedimethylamino-4-Methylethylamino-5-Hydroxytetracycline*

A fermentation medium was prepared according to the following formula:

| | | |
|---|---|---|
| $(NH_4)_2SO_4$ | grams | 5.0 |
| $CaCO_3$ | do | 9.0 |
| $NH_4Cl$ | do | 1.5 |
| $MgCl_2 \cdot 6H_2O$ | do | 2.0 |
| $FeSO_4 \cdot 7H_2O$ | milligrams | 60 |
| $MnSO_4 \cdot 4H_2O$ | do | 50 |
| $CoCl_2 \cdot 6H_2O$ | do | 5 |
| $ZnSO_4 \cdot 7H_2O$ | do | 100 |
| Corn steep liquor | grams | 25.0 |
| Corn starch | do | 55.0 |

Water, q.s. to 1000 milliliters.

To this medium was added 320 milligrams of dl-ethionine. The medium was dispensed in appropriate amounts into flasks containing 2% (v./v.) of lard oil. These media were then sterilized, inoculated with a vegetative inoculum of *S. rimosus* (ATCC No. 10970) and incubated at 25° C. on a rotary shaker for 120 hours. The contents of these flasks were combined to give 1000 milliliters of fermentation mash which was further diluted with 500 milliliters of water. The pH of this mixture was adjusted to 1.5 with sulfuric acid. After the addition of 50 grams of Hyflo the mixture was stirred and filtered and the filtrate was saved. The filter cake was reextracted with 1.5 liters of hot (45° C.) water, filtered and the filtrate was saved. The two acid filtrates were then combined, mixed with 18 grams of ammonium oxalate and stirred for 15 minutes. The pH was raised to 2.5 with 25% sodium hydroxide and stirring was continued for 15 minutes. At the termination of this period of stirring, 7.5 grams of Hyflo was added and the mixture was filtered. A 1.0 milliliter portion of Arquad 16 was added to the filtrate. (Arquad 16 is a mixture of alkyl trimethylammonium chloride and dialkyldimethylammonium chloride in which the alkyl groups consist of 90% hexadecyl, 6% octadecyl and 4% octadecenyl in 50% isopropanol.) The pH of the solution was raised to 8.5 with sodium hydroxide, then 50 milliliters of methyl isobutyl ketone was added, the mixture was stirred for 20 minutes and allowed to settle for one-half hour before the supernatant methyl isobutyl ketone was decanted. A reextraction with another 75 milliliters of methyl isobutyl ketone followed and the supernatant methyl isobutyl ketone was again decanted. The two decanted methyl isobutyl ketone volumes were combined, a 5.6 gram portion of Hyflo filter aid was added and the mixture was stirred and filtered. Four milliliters of water was added to the filtrate, the pH was adjusted to 1.0 with concentrated hydrochloric acid and the mixture was agitated for 15 minutes. The mixture was allowed to settle and then the aqueous phase was removed. The pH of this aqueous phase was raised to 4.5 with sodium hydroxide. The crystals which formed were collected by filtration then washed with water, 2-ethoxyethanol and finally with isopropanol. The washed crystals were dried under vacuum for 6 hours at 40° C. A total of 130 milligrams of crude product was obtained.

EXAMPLE 2

*Production of 4-Dedimethylamino-4-Methylethylamino-5-Hydroxytetracycline*

The procedure of Example 1 was repeated except that varying quantities of dl-ethionine (0.16, 0.30, 0.50, 1.0, 2.0 and 4.0 milligrams per milliliter) and of l-ethionine (0.08, 0.15, 0.25, 0.50, 1.0 and 2.0 milligrams per milliliter) were added in separate runs. In all instances the formation of 4-dedimethylamino-4-methylethylamino-5-hydroxytetracycline was observed.

EXAMPLE 3

*Production of 4-Dedimethylamino-4-Methylethylamino-5-Hydroxytetracycline*

A fermentation medium was prepared according to the following formula:

| | |
|---|---|
| $(NH_4)_2SO_4$ | grams 8.0 |
| $CaCO_3$ | do 10.0 |
| $NH_4Cl$ | do 1.5 |
| $MgCl_2 \cdot 6H_2O$ | do 2.0 |
| $FeSO_4 \cdot 7H_2O$ | milligrams 60 |
| $ZnSO_4 \cdot 7H_2O$ | do 100 |
| $CoCl_2 \cdot 6H_2O$ | do 5 |
| $MnSO_4 \cdot 4H_2O$ | do 50 |
| Starch | grams 55 |
| KCl | do 1.28 |
| $H_3PO_4$ (85%) | milligrams 240 |
| l-Histidine | do 800 |

Water, q.s. to 1000 milliliters.

A portion of this medium was used as a control while another portion was modified to include 0.16 milligram per milliliter of l-ethionine. The media were dispensed in appropriate amounts into flasks containing 2% (v./v.) of lard oil, sterilized, inoculated with *S. rimosus* (ATCC No. 10970) and incubated at 25° C. on a rotary shaker for 120 hours. Two milliliter portions of the control and test mashes were acidified to pH 1.0 with hydrochloric acid and then filtered. These acid mash filtrates were streaked on Whatman No. 1 chromatographic paper buffered at pH 3.0 with 0.3 molar monobasic sodium phosphate. The paper strips were developed with n-butanol buffered at pH 3.0. The paper strip containing the test mash filtrate exhibited a new zone of inhibition with an $R_f$ of 0.51 as well as the zone at 0.36 which was also present in the control.

What is claimed is:

1. A process for producing 4-dedimethylamino-4-methylethylamino-5-hydroxytetracycline which comprises cultivating a 5-hydroxytetracycline producing strain of a species of the genus Streptomyces selected from the group consisting of *S. rimosus*, *S. platensis* and *S. hygroscopicus* in an aqueous nutrient medium containing assimilable sources of carbohydrate, nitrogen and inorganic salts and containing at least 0.08 mg./ml. of l-ethionine under submerged aerobic conditions until substantial quantities of 4-dedimethylamino-4-methylethylamino - 5-hydroxytetracycline are produced in said medium, and recovering the 4-dedimethylamino - 4 - methylethylamino - 5 - hydroxytetracycline so produced.

2. A process for producing 4-dedimethylamino-4-methylethylamino-5-hydroxytetracycline which comprises cultivating a 5-hydroxytetracycline producing strain of a species of the genus Streptomyces selected from the group consisting of those having accession numbers ATCC No. 10970, NRRL No. 2364 and NRRL No. B–1503 in an aqueous nutrient medium containing assimilable sources of carbohydrate, nitrogen and inorganic salts and containing at least 0.08 mg./ml. of l-ethionine under submerged aerobic conditions until substantial quantities of 4-dedimethylamino - 4-methylethylamino-5-hydroxytetracycline are produced in said medium, and recovering the 4 - dedimethylamino - 4 - methylethylamino-5-hydroxytetracycline so produced.

3. A process for producing 4-dedimethylamino-4- methylethylamino-5-hydroxytetracycline which comprises cultivating a 5-hydroxytetracycline producing strain of a species of the genus Streptomyces selected from the group consisting of *S. rimosus*, *S. platensis* and *S. hygroscopicus* in an aqueous nutrient medium containing assimilable sources of carbohydrate, nitrogen and inorganic salts and containing at least 0.10 mg./ml. of dl-ethionine under submerged aerobic conditions until substantial quantities of 4-dedimethylamino - 4 - methylethylamino-5-hydroxytetracycline are produced in said medium, and recovering the 4-dedimethylamino - 4 - methylethylamino-5-hydroxytetracycline so produced.

4. A process for producing 4-dedimethylamino-4-methylethylamino-5-hydroxytetracycline which comprises cultivating a 5-hydroxytetracycline producing strain of a species of the genus Streptomyces selected from the group consisting of those having accession numbers ATCC No. 10970, NRRL No. 2364 and NRRL No. B–1503 in an aqueous nutrient medium containing assimilable sources of carbohydrate, nitrogen and inorganic salts and containing at least 0.10 mg./ml. of dl-ethionine under submerged aerobic conditions until substantial quantities of 4-dedimethylamino-4-methylethylamino - 5-hydroxytetracycline are produced in said medium, and recovering the 4-dedimethylamino - 4-methylethylamino-5-hydroxytetracycline so produced.

References Cited in the file of this patent

UNITED STATES PATENTS

| | | |
|---|---|---|
| 2,516,080 | Sobin et al. | July 18, 1950 |
| 3,022,347 | Tanner et al. | Feb. 20, 1962 |